(12) United States Patent
Liu

(10) Patent No.: US 10,972,699 B2
(45) Date of Patent: *Apr. 6, 2021

(54) VIDEO COMMUNICATION DEVICE AND METHOD FOR VIDEO COMMUNICATION

(71) Applicant: Beijing FUNATE Innovation Technology Co., LTD., Beijing (CN)

(72) Inventor: Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,674

(22) Filed: Mar. 28, 2019

(65) Prior Publication Data

US 2019/0306459 A1    Oct. 3, 2019

(30) Foreign Application Priority Data

Mar. 28, 2018    (CN) .......................... 201810282140.0

(51) Int. Cl.
*H04N 7/14* (2006.01)
*G06T 7/73* (2017.01)
*G06K 9/00* (2006.01)

(52) U.S. Cl.
CPC ......... *H04N 7/147* (2013.01); *G06K 9/00228* (2013.01); *G06K 9/00604* (2013.01); *G06T 7/73* (2017.01); *H04N 7/144* (2013.01)

(58) Field of Classification Search
USPC .......................................... 348/14.01–14.09
See application file for complete search history.

(56) References Cited

U.S. PATENT DOCUMENTS

| 8,970,663 | B2 | 3/2015 | Gagneraud | |
|---|---|---|---|---|
| 9,462,223 | B2 | 10/2016 | White | |
| 2008/0043100 | A1* | 2/2008 | Sobel | H04N 9/3194 348/139 |
| 2008/0184124 | A1* | 7/2008 | Agarwal | G06Q 10/10 715/733 |
| 2009/0102763 | A1 | 4/2009 | Border et al. | |

(Continued)

FOREIGN PATENT DOCUMENTS

| CN | 203966475 | 11/2014 |
|---|---|---|
| EP | 2509309 | 10/2012 |

(Continued)

*Primary Examiner* — Maria El-Zoobi
(74) *Attorney, Agent, or Firm* — ScienBiziP, P.C.

(57) ABSTRACT

A local video communication device, the device includes a local translucent display device configured to display remote video information received from a remote video communication device; and a local camera array configured to capture local video information of a plurality of local users; wherein the local translucent display device includes a naked-eye three-dimensional display, the local camera array comprises a plurality of cameras arranged in a two-dimensional array, the local camera array is placed on a back of the local translucent display device, and the local translucent display device further comprises a micro processing unit, wherein the micro processing unit includes: a micro processing unit, where the micro processing unit includes a video capture and processing module, a location acquisition module, a communication module and a display module.

15 Claims, 20 Drawing Sheets

(56) References Cited

U.S. PATENT DOCUMENTS

| | | | |
|---|---|---|---|
| 2009/0278913 A1 | 11/2009 | Rosenfeld et al. | |
| 2014/0098175 A1* | 4/2014 | Nagano | H04N 7/144 348/14.01 |
| 2016/0183144 A1* | 6/2016 | Vallabhu | H04W 36/0011 370/331 |
| 2017/0150132 A1* | 5/2017 | Tian | H04N 13/373 |
| 2017/0208292 A1* | 7/2017 | Smits | H04N 7/147 |
| 2017/0264865 A1* | 9/2017 | Huangfu | H04N 5/247 |
| 2019/0037170 A1* | 1/2019 | Zimmerman | H04N 5/2353 |
| 2019/0049782 A1* | 2/2019 | Liu | G02F 1/133526 |
| 2019/0121522 A1* | 4/2019 | Davis | G06F 3/04815 |

FOREIGN PATENT DOCUMENTS

| | | |
|---|---|---|
| TW | I248021 | 1/2006 |
| TW | 200923495 | 6/2009 |
| TW | 200948070 | 11/2009 |

* cited by examiner

VIDEO COMMUNICATION DEVICE AND METHOD FOR VIDEO COMMUNICATION

CROSS-REFERENCE TO RELATED APPLICATIONS

This application is related to applications entitled, "VIDEO COMMUNICATION DEVICE AND METHOD FOR VIDEO COMMUNICATION", filed Mar. 28 2019 Ser. No. 16/367,682, "VIDEO COMMUNICATION DEVICE AND METHOD FOR VIDEO COMMUNICATION", filed Mar. 28 2019 Ser. No. 16/367,693, and "WINDOW SYSTEM BASED ON VIDEO COMMUNICATION", filed Mar. 28 2019 Ser. No. 16/367,732, "VIDEO COMMUNICATION DEVICE AND METHOD FOR VIDEO COMMUNICATION", filed Mar. 28 2019 Ser. No. 16/367,806.

FIELD

The subject matter herein generally relates to a video communication device.

BACKGROUND

With the development of the communication technology, video communication has been widely used in work places and people's lives in general, such as remote video conferencing of a company, video chat with friends from different places. However, users of a remote video communication system cannot look directly into each other's eyes. The reason is that the display of the remote video communication system and the camera of the remote video communication system are not in the same position. As a result, users cannot make direct eye contact with each other when using the remote video communication system, thereby undermining the communication experience.

Therefore, there is room for improvement within the art.

BRIEF DESCRIPTION OF THE DRAWINGS

Many aspects of the embodiments may be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures

DETAILED DESCRIPTION

Figure 1:
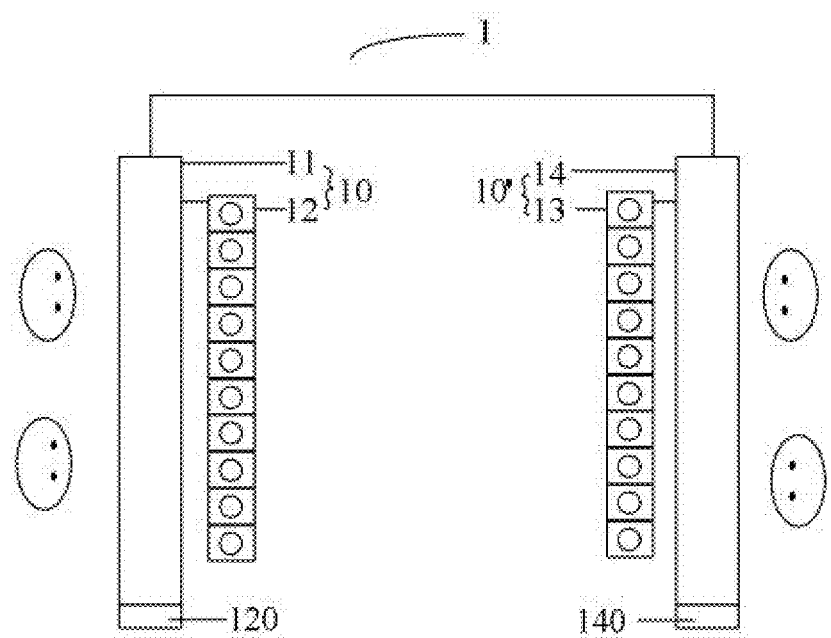
FIG. 1 is a schematic view of an embodiment of a video communication system.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection may be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one."

In FIG. 1, an embodiment of a video communication system 1 is provided. The video communication system 1 comprises a local video communication device 10 and a remote video communication device 10'. The local video communication device 10 and the remote video communication device 10' are connected with each other through wired and/or wireless connections, and used for communicating via video. The local video communication device 10 comprises a local translucent display device 11 and a local camera array 12. The remote video communication device 10' comprises a remote translucent display device 13 and a remote camera array 14. The local camera array 12 is placed on the back of the local translucent display device 11, and the local camera array 12 includes a plurality of local cameras. Video information captured by one or more local cameras corresponding to a position of a remote user's face on the local translucent display device 11 may be transmitted to the remote video communication device 10'. The remote camera array 14 is placed on the back of the remote translucent display device 13, and the remote camera array 14 includes a plurality of remote cameras. Video information captured by one or more remote cameras corresponding to a position of a local user's face on the remote translucent display device 13 may be transmitted to the local video communication device 10. Since the local video communication device 10 and the remote video communication device 10' have the same structure and functionalities, only the structure and functionalities of the local video communication device 10 are described in detail below.

Figure 2:
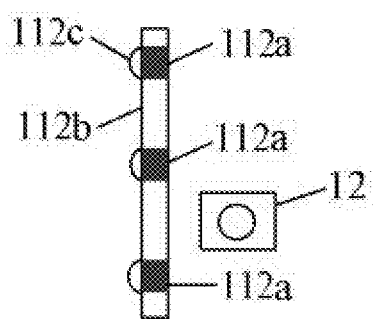
FIG. 2 is a schematic view of an embodiment of a translucent display.
Figure 3:
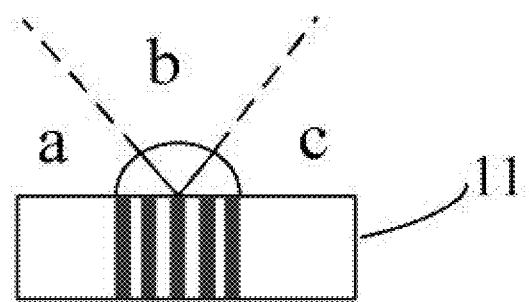
FIG. 3 is a schematic view of an embodiment of display areas of the translucent display.
Figure 4:
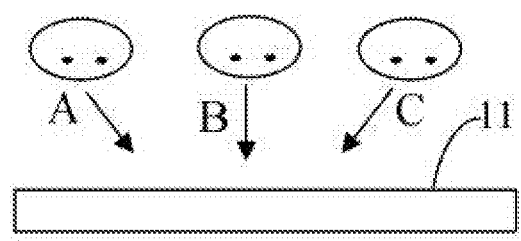
FIG. 4 is a schematic view of an embodiment of visual directions of local users.

The local translucent display device 11 is used to display remote video information. The remote video information is captured by the remote camera array 14 and transmitted to the local translucent display device 11. The local translucent display device 11 is translucent, so that objects in front of the translucent display device may be captured from the back of the translucent display device 11. In FIG. 2, the local translucent display device 11 is a naked-eye three-dimensional (3D) display. The naked-eye 3D display comprises a plurality of pixel units 112a spaced from one another, and an area between two adjacent pixel units 112a is defined as an interval area 112b. The interval areas 112b are transparent so that light may pass through the interval areas 112b. The pixel unit 112a is non-transparent for displaying video information. There is a plurality of microlenses 112c placed on the plurality of pixel units 112a. The plurality of microlenses 112c covers the plurality of pixel units 112a, while the interval areas 112b are exposed. The naked-eye 3D display may simultaneously provide video information to a plurality of local users located in different directions, and simultaneously display different video information to the plurality of local users according to the different directions of the plurality of local users. In FIG. 3, a display area of each pixel unit 112a in the naked-eye 3D display may be equally divided into N units to accommodate different viewing angles and/or positions, and N is greater than or equal to two. In one embodiment, the display area of each pixel unit 112a in the naked-eye 3D display is divided into three units, and the video information displayed in the three units of the naked-eye 3D display are different, and the three units may be defined as unit a, unit b, and unit c. In FIG. 4, when a viewing position of a local user A is in unit a, a viewing position of a local user B is in unit b, and a viewing position of a local user C is in unit c, the video information seen by each of the users A, B and C is different. The scene in front of the translucent display can be captured by human eyes or the local camera 12 on the back of the translucent display through the interval areas 112b.

Figure 5:
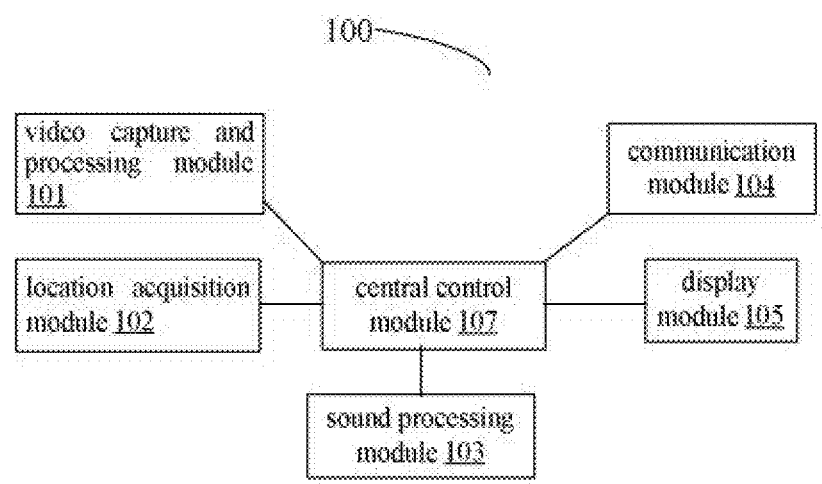
FIG. 5 is a schematic view of an embodiment of a micro processing unit.

The local video communication device 10 further comprises a micro processing unit 100. In FIG. 5, the micro processing unit 100 comprises a video capture and processing module 101, a location acquisition module 102, a sound processing module 103, a communication module 104, a display module 105, and a central control module 107. The video capture and processing module 101 is used to capture and process the local user's video information. Processing the local user's video information includes clipping the video information, correcting distorted video information, and calculating the occlusion relationship of the scene. The video capture and processing module 101 may control the plurality of local cameras to work simultaneously, and only select video information captured by one or more local cameras corresponding to the remote user's face image position, and process the video information. Local cameras of the local camera array 12 may also work selectively, and the video capture and processing module 101 may select one or more local cameras corresponding to the remote user's face image position to work, and process the video information captured by the one or more local cameras. The location acquisition module 102 is used to obtain each local user's face image position. In one embodiment, the location acquisition module 102 may be used to obtain the local user's eyes image position. The sound processing module 103 may be used to control the sound playback of video information and to capture local sounds. The communication module 104 may be used to communicate with the remote video communication device 10', such as receiving video information and position information from the remote video communication device 10', and transmitting video information and position information to the remote video communication device 10'. The display module 105 may be used to display the remote video information. The display module 105 may be further used to display different remote video information according to each local user's different visual direction. The central control module 107 may be used to coordinate and control the other modules. The position information obtained by the location acquisition module 102 may be transmitted to the video capture and processing module 101 by the central control module 107, thereby video information conforming to a three-dimensional relationship can be generated.

Figure 6:
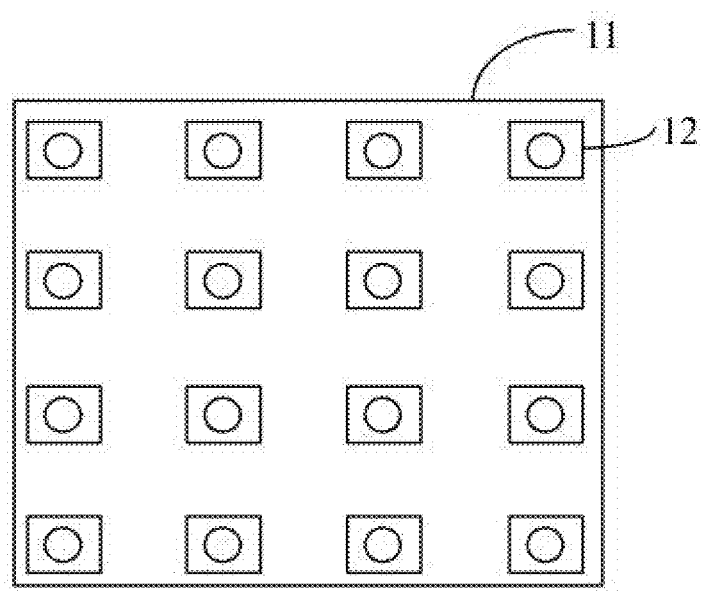
FIG. 6 is a schematic view of an embodiment of a local camera array.

The local camera array 12 may be used to capture local user's video information, which may be transmitted to the remote video communication device 10'. The local camera array 12 is placed on the back of the local translucent display device 11. Since the local translucent display device 11 is translucent, the local camera array 12 may capture the scene of the local user in front of the local translucent display device 11. In FIG. 6, the local camera array 12 may be further arranged in a two-dimensional camera array. The plurality of local cameras of the local camera array 12 may work simultaneously. For example, the video capture and processing module 101 controls the plurality of local cameras to work simultaneously, selects video information of one or more local cameras, and calculates the video information to generate a video screen. The position of the one or more local cameras may correspond to the position of the remote user's face image. The plurality of local cameras of the local camera array 12 may also work selectively, the video capture and processing module 101 may select one or more local cameras to work, and the position of the one or more local cameras may correspond to the position of the remote user's face image. The video information of the one or more local cameras may be synthesized into an integrated video to be transmitted to the remote video communication device 10'.

When the local translucent display device 11 displays a screen of a plurality of remote users, the plurality of remote users in the screen correspond to a plurality of local cameras. Video information captured by the plurality of local cameras may be simultaneously transmitted to the remote video communication device 10'. When the positions of the remote users' images change, the positions of the plurality of local cameras corresponding to the remote users' images also change. The positions of the remote users' images corresponding to the local cameras refer to positions of the remote users' face images. In one embodiment, the positions of the remote users' images corresponding to the local cameras refer to positions of the remote users' eyes' images, therefore local users and remote users can have a real experience of looking at each other. The local cameras corresponding to the remote users' images are equivalent to the eyes of the remote users. When the remote users' images move, the corresponding local cameras change accordingly. The local cameras in different positions capture different video information. Therefore, the video information seen by the moving remote users may vary.

The video capture and processing module 101 can select cameras to accurately capture the corresponding video information according to the positions of the remote users' images, thereby allowing the remote users to have an immersive experience. When a remote user's face image corresponds to a single camera, the video capture and processing module 101 selects video information captured by the single camera. When the remote user's face image becomes larger and corresponds to a plurality of cameras, the video capture and processing module 101 selects video information captured by one of the plurality of cameras which is closest to the local user's eyes image. When the remote user's face image becomes larger, the remote user's one eye position corresponds to one camera, and the remote user's the other eye position corresponds to another camera, the video capture and processing module 101 selects video information captured by two cameras corresponding to both eyes and forms an integrated video, or the video capture and processing module 101 can also select video information captured by the camera which corresponds to the middle position of between the two eyes. When the remote user's face image becomes larger, the remote user's one eye position corresponds to a plurality of cameras, the video capture and processing module 101 selects video information captured by one of the plurality of cameras which is closest to the local user's pupil of that eye.

Figure 7:
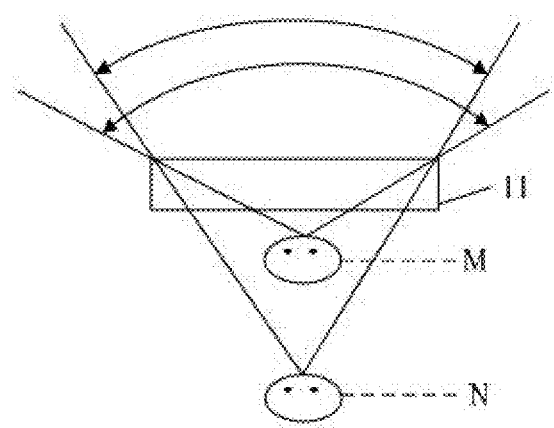
FIG. 7 is a schematic view of an embodiment of local users' positions and users' fields of view.

The local camera array 12 may include a binocular camera. The binocular camera may simulate the binocular vision of human eyes to capture scene information, and calculate the scene information in three dimensions to obtain the depth information of the scene. For example, the depth information between a local user and the local translucent display device 11 may be obtained by the local camera array 12, then the depth information may be transmitted to the remote video communication device 10', and the remote video communication device 10' may select the video information according to the depth information. In FIG. 7, when the local user is located at the position M in front of the local translucent display device 11, the local user's field of view is large. When the local user is located at the position N in front of the local translucent display device 11, the local user's field of view becomes smaller than that at position N. The remote camera array 14 is equivalent to the local user's eyes. The local user may move back and forth in front of the local translucent display device 11, but the distance between the remote camera array 14 and the remote translucent display device 13 is constant, thus the remote camera array 14 needs to shoot a large field of view for selection. In one embodiment, the viewing angle of the remote camera array 14 reaches 180 degrees. The display module 105 may select the corresponding video information from a large field of view according to the position of the local user. In one embodiment, the local camera array 12 and the remote camera array 14 may include cameras with wide angles and/or high pixels.

Furthermore, the depth information may also be obtained by the location acquisition module 102, or by calculating data using cloud computing, and the data is send to the cloud by the location acquisition module 102. The transmission of the depth information may be performed by the communication module 104. The local camera may further include four camera units arranged in a crossover manner, for example, to calculate the occlusion relationship in the vertical direction. The local video communication device 10 may further include a depth sensor 120 to specifically sense the depth information.

Figure 8:
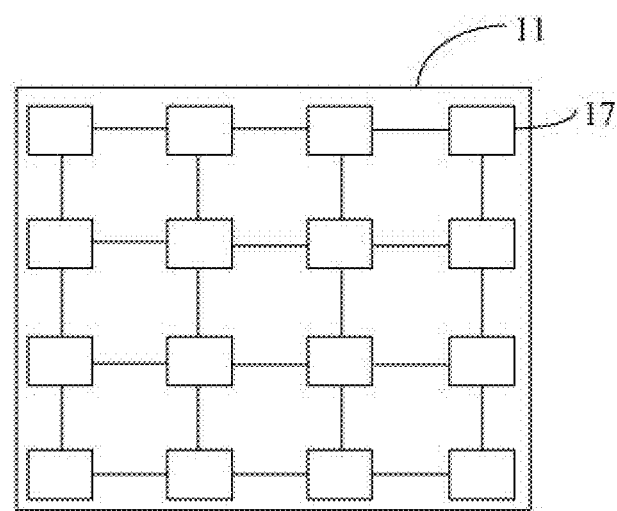
FIG. 8 is a schematic view of an embodiment of a speaker array.
Figure 9:
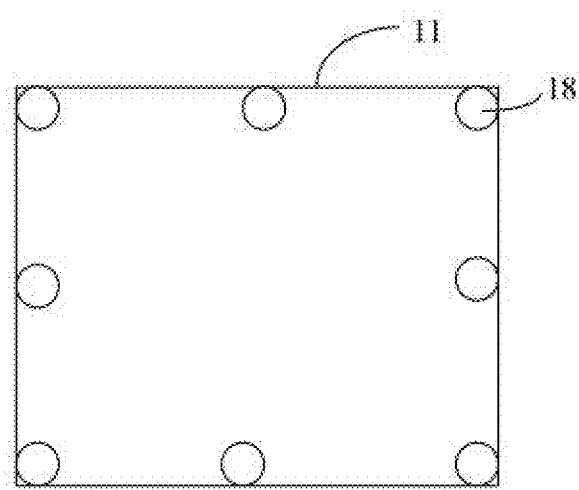
FIG. 9 is a schematic view of an embodiment of a microphone array.

In FIG. 8, the local video communication device 10 may further include a speaker array 17. The speaker array 17 may be distributed on the back of the local translucent display device 11. The speaker array 17 may be used to play the remote user's voice according to the source location of the remote user. The speaker array 17 may also be arranged to be beyond the range of the local translucent display device 11 to simulate a sound source outside the field of view. The speaker array 17 allows the local user to have an immersive feeling. For example, if there is a cat howling near the remote video communication device 10', but the cat is out of the video screen, the local user can still hear the cat's voice. In FIG. 9, the local video communication device 10 may further include a plurality of stereo microphones 18, and the plurality of stereo microphones 18 is placed in front of the local translucent display device 11. The plurality of stereo microphones 18 is used to collect local sounds for transmission to each other.

The advantages of the local video communication device 10 may include, but are not limited to, the following. A camera array is placed behind a translucent screen, and video information of one or more cameras may be selected according to the position of the remote user's face image displayed on the translucent screen. Thus, when the local user looks at the position of the remote user's eyes image displayed on the translucent screen, the camera may capture the local user's face, and the local user and the remote user can look directly into each other's eyes. The local video communication device 10 provides users with an experience as if only a piece of transparent glass is placed between the local user and the remote user, which greatly increases the immersiveness. The local user and the remote user may feel like communicating with each other as if they are talking to each other on opposite sides of a glass.

Figure 10:
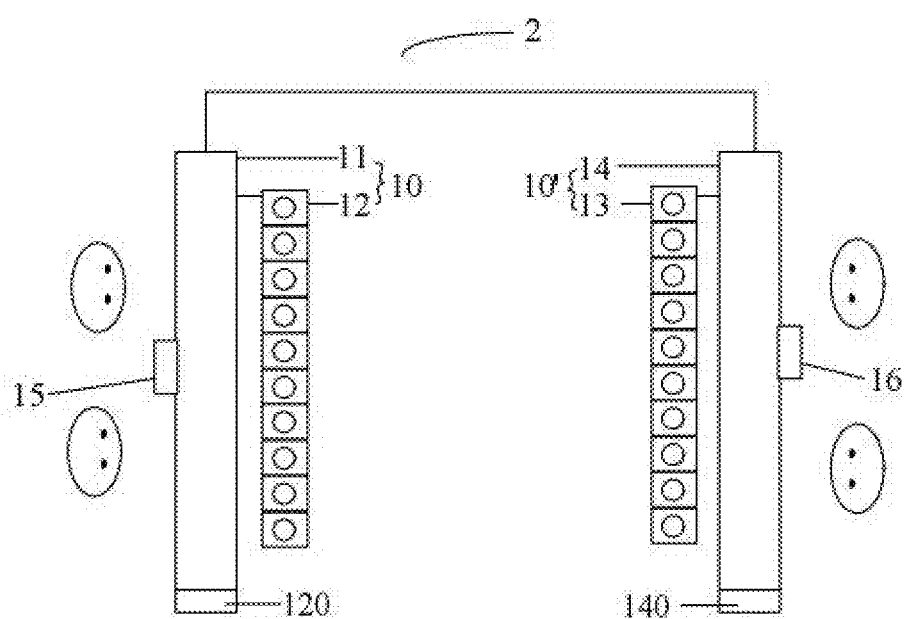
FIG. 10 is a schematic view of an embodiment of a video communication system.

In FIG. 10, another embodiment of a video communication system 2 is provided. The video communication system 2 comprises a local translucent display device 11, a local camera array 12, a local identification device 15, a remote translucent display device 13, a remote camera array 14 and a remote identification device 16. The local identification device 15 is placed on the local translucent display device 11. The local identification device 15 may be used to identify position information of the local users' faces. One or more local cameras of the local camera array 12 corresponding to the position of the remote user's image may be selected. The remote identification device 16 is placed on the remote translucent display device 13. The remote identification device 16 is used to identify position information of the remote users' face. One or more remote cameras of the remote camera 14 corresponding to the position of the local user's image may be selected.

The video communication system 2 is similar to the video communication system 1 in FIG. 1. Among the differences, the video communication system 2 includes the local identification device 15 and the remote identification device 16. The local identification device 15 may identify the position information of local users and transmit the position information to the remote camera array 14. The local camera array 12 may be used to capture video information of local users. The remote identification device 16 may identify the position information of remote users and transmit the position information to the local camera array 12. The remote camera array 14 may be used to capture video information of remote users. The local identification device 15 and the remote identification device 16 may include one or more of optical cameras, infrared cameras, position detection units for use with position sensor worn by the user. In one embodiment, the local identification device 15 and the remote identification device 16 are both Kinect devices and used to identify the position information of the user eyes.

Figure 11:
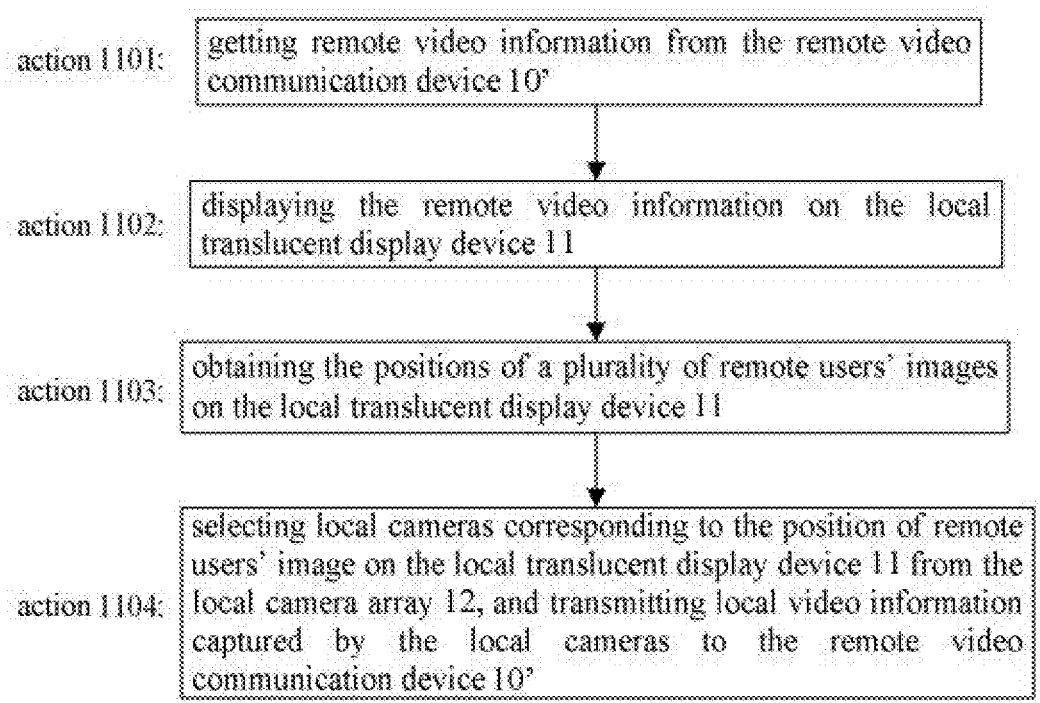
FIG. 11 is a flow chart of an embodiment of a method for video communication.

In FIG. 11, an embodiment of a method for video communication suitable for local video communication device 10 is provided. The method comprises:

action 1101, receiving remote video information from the remote video communication device 10';

action 1102, displaying the remote video information on the local translucent display device 11;

action 1103, obtaining the positions of a plurality of remote users' images on the local translucent display device 11;

action 1104, selecting local cameras corresponding to the position of remote users' image on the local translucent display device 11 from the local camera array 12, and transmitting local video information captured by the local cameras to the remote video communication device 10'.

Figure 12:
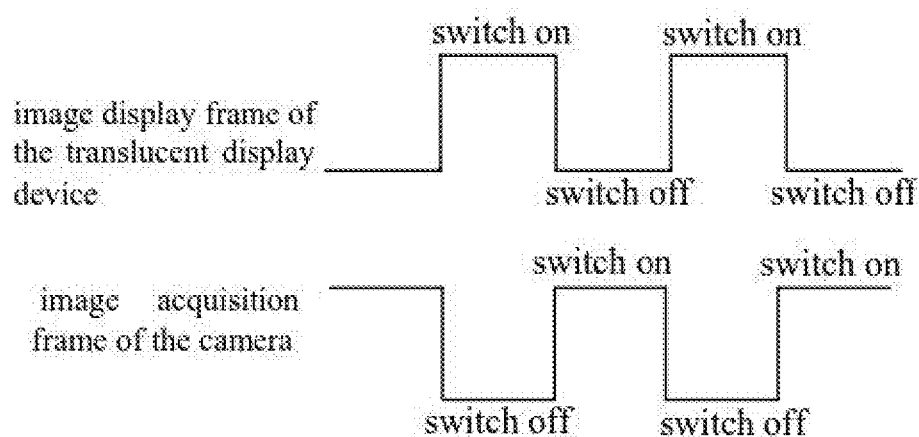
FIG. 12 is a working principle diagram of an image display frame of the translucent display and an image acquisition frame of cameras.

In action 1101, the remote video information is captured by the remote camera 14. The remote camera array 14 is placed on the back of the remote translucent display device 13, and the remote camera array 14 may capture the remote video information through the remote translucent display device 13. When a camera captures video information through a translucent display device, light emitted by the pixel does not enter the back of the translucent display device due to the obstruction of a light shielding layer under the pixel, and the camera cannot be disturbed. Therefore, during the operation of the translucent display device, the camera on the back of the translucent display device may also work in real time. Furthermore, in order to make the camera work without interference of light, an image display frame of the translucent display device and an image acquisition frame of the camera may be staggered. In FIG. 12, the image display frame of the translucent display device and the image acquisition frame of the camera may be alternately performed one frame by one frame. When the image display frame is switched on, the image acquisition frame is turned off; when the image display frame is turned off, the image acquisition frame is switched on. Since the image display frame and the image acquisition frame are alternately performed very fast, and human eyes cannot distinguish, it does not affect human's video communication experience.

When there is a plurality of remote users, the plurality of remote users correspond to the plurality of remote cameras, and the plurality of remote cameras may each capture video information. The plurality of video information is processed by the remote video communication device 10' to form a remote video information. The local video communication device 10 may receive the remote video information through the communication module 104.

In action 1102, the remote video information is displayed on the local translucent display device 11 by the display module 105. The local translucent display device 11 is a naked-eye 3D display, the naked-eye 3D display may display different video information to the plurality of local users according to the different directions of the plurality of local users.

In action 1103, the position of remote user's image on the local translucent display device 11 may be obtained by the following methods:

Method 1, the position of the user by an identification device is obtained. The identification device may be placed in front of the translucent display device to identify the remote user's face. The identification device may be optical cameras, infrared cameras, position detection units for use with position sensor worn by the remote user.

Method 2, a relative position of the remote user in video captured by the camera is obtained, and the position of the remote user according to the position of the camera and the relative position of the remote user is calculated. The "relative position of the user" means that the position of remote user in the video.

In action 1104, the local cameras corresponding to the position of remote users' image on the local translucent display device 11 may be selected from the local camera array 12 by the video capture and processing module 101. Since the local cameras is placed behind the position of the remote user's image on the local translucent display device 11, when the local user looks at the position of the remote user's eyes on the local translucent display device 11, the local cameras may capture the local user's face, and the local user and the remote user can look directly into each other's eyes. The local video information captured by the local cameras may be transmitted to the remote video communication device 10' by the communication module 104.

In the video communication process of two users, if one user leaves the field view of the camera array, there is no camera of the camera array corresponding to the user. At this time, an initial camera may be selected from the camera array to work when there is no user in front of the video communication device, and the initial camera may be any camera of the camera array. For example, when the remote user leaves the room where the video communication system is located, which exceeds the field of view of the remote camera array 14, there is no camera of the camera array 12 corresponding to the remote user. At the same time, the field of the video played by the remote translucent display device 13 is no longer changed. However, since the local user is still in front of the local translucent display device 11, the cameras of the remote camera array 14 still work according to the position of the local user, and the local user may still see remote video information with different view fields.

The advantages of the method for video communication may include, but are not limited to, the following. The local user and the remote user can look at each other's eyes during video communication by selecting the cameras in real time. Thus, the method improves the interactive experience of the users. When the user moves in front of the translucent display device, the video information that the user sees changes accordingly, and the user's immersive experience is also improved.

Figure 13:
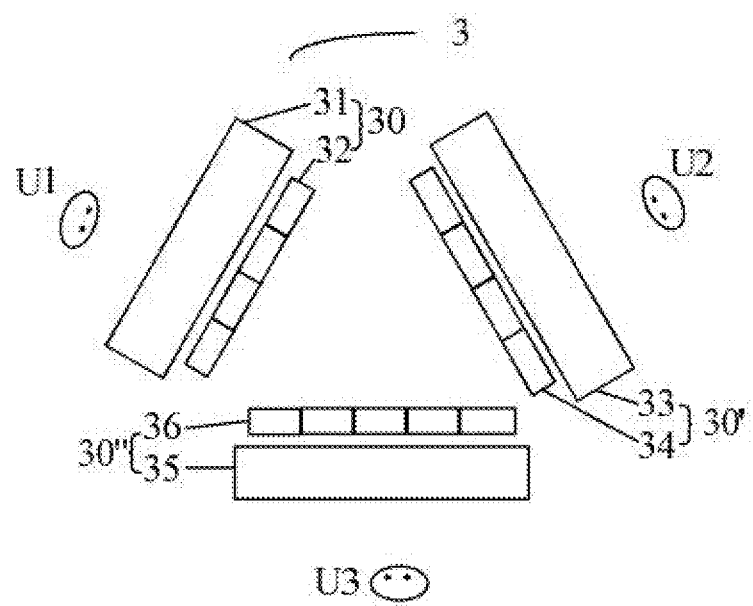
FIG. 13 is a schematic view of an embodiment of a video communication system.

In FIG. 13, an embodiment of a video communication system 3 is provided. The video communication system 3 comprises a plurality of video communication devices. The plurality of video communication devices is respectively used as a plurality of user terminals. The plurality of video communication devices is connected to one another through wired and/or wireless connections. In one embodiment, the video communication system 3 comprises three video communication devices, such as a first video communication device 30, a second video communication device 30', a third video communication device 30". The first video communication device 30 is used as a first user terminal for a first user (U1). The second video communication device 30' is used as a second user terminal for a second user (U2). The third video communication device 30" is used as a third user terminal for a third user (U3). The first video communication device 30 comprises a translucent display 31 and a local camera array 32. The local camera array 32 is placed on the back of the translucent display 31. Video information captured by a camera of the local camera array 32 that is corresponding to a position of the second user's image displayed on the translucent display 31, is transmitted to the second video communication device 30'. Video information captured by a camera of the local camera array 32 that is corresponding to a position of the third user's image displayed on the translucent display 31, is transmitted to the third video communication device 30". The second video communication device 30' comprises a translucent display 33 and a local camera array 34. The local camera array 34 is placed on the back of the translucent display 33. Video information captured by a camera of the local camera array 34 that is corresponding to a position of the first user's image displayed on the translucent display 33, is transmitted to first video communication device 30. Video information captured by a camera of the local camera array 34 that is corresponding to a position of the third user's image displayed on the translucent display 33, is transmitted to the third video communication device 30". The third video communication device 30" comprises a translucent display 35 and a local camera array 36. The local camera array 36 is placed on the back of the translucent display 35. Video information captured by a camera of the local camera array 36, which is corresponding to a position of the first user's image displayed on the translucent display 35, is transmitted to the first video communication device 30. Video information captured by a camera of the local camera array 36, which is corresponding to a position of the second user's image displayed on the translucent display 35, is transmitted to the second video communication device 30'. Since the structures and functions of the first video communication device 30, the second video communication device 30', and the third video communication device 30" are substantially the same, only the first video communication device 30 is described in detail below.

Figure 14:
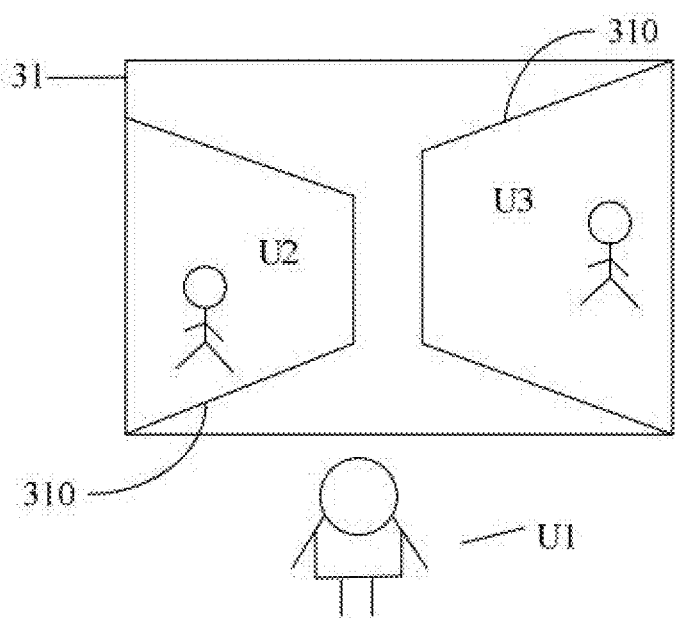
FIG. 14 is a schematic view of an embodiment of a video display of the translucent display.
Figure 15:
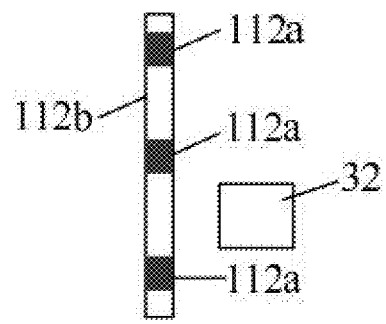
FIG. 15 is a schematic view of an embodiment of a translucent display.

In FIG. 14, the translucent display 31 is used to display video information received from other two user terminals. The video information received from other two user terminals may be displayed by two virtual windows 310 disposed at different positions of the translucent display 31. The first user is defined as to U1, the second user is defined as to U2, and the third user is defined as to U3. The user U1 may respectively see video information of U2 and U3 through the two virtual windows 310 displayed on the translucent display 31. The number of virtual windows 310, the order of virtual windows 310 and the size of virtual windows 310 may be adjusted according to numbers of user terminals. The translucent display 31 is translucent, and it means that the scene in front of the translucent display 31 may be captured by the local camera array 32 located at the back of the translucent display 31. In FIG. 15, the translucent display 31 comprises a plurality of pixel units 112a spaced from one another, and the area between two adjacent pixel units 112a is defined as an interval area 112b. The interval area 112b is transparent and a light transmission area. The pixel unit 112a is a non-transparent area for displaying video information. The scene in front of the translucent display 31 may be captured by human eyes or the camera array 32 from the back of the translucent display 31 through the interval area 112b.

Figure 16:
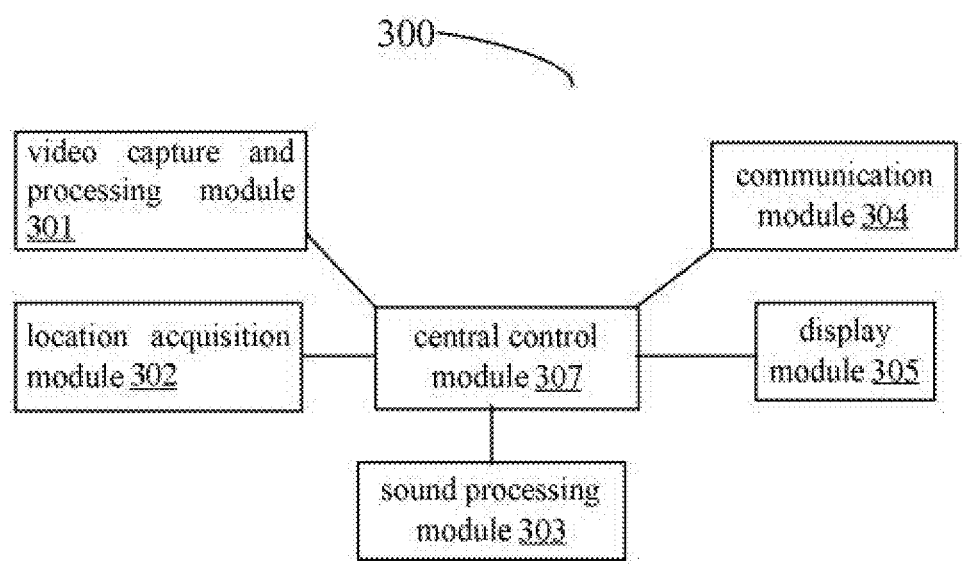
FIG. 16 is a schematic view of an embodiment of a micro processing unit.

The translucent display 31 further comprises a micro processing unit 300. In FIG. 16, the micro processing unit 300 comprises a video capture and processing module 301, a location acquisition module 302, a sound processing module 303, a communication module 304, a display module 305, and a central control module 307. The video capture and processing module 301 is used to capture and process the local user's video information. Processing the local user's video information includes clipping the video information, correcting distorted video information, and calculating the occlusion relationship of the scene. The location acquisition module 302 is used to obtain each local user's face position. In one embodiment, the location acquisition module 302 is used to obtain the local user's eyes image position. The sound processing module 303 is used to control the sound playback of video information and to capture local sounds. The communication module 304 is used to communicate with the second video communication device 30' and the third video communication device 30", such as receiving video information and position information from the second video communication device 30' and the third video communication device 30", or transmitting video information and position information to the second video communication device 30' and the third video communication device 30". The display module 305 is used to set a plurality of virtual windows 310 and display video information through the plurality of virtual windows 310. The central control module 307 is used to coordinate and control the other modules.

Figure 17:
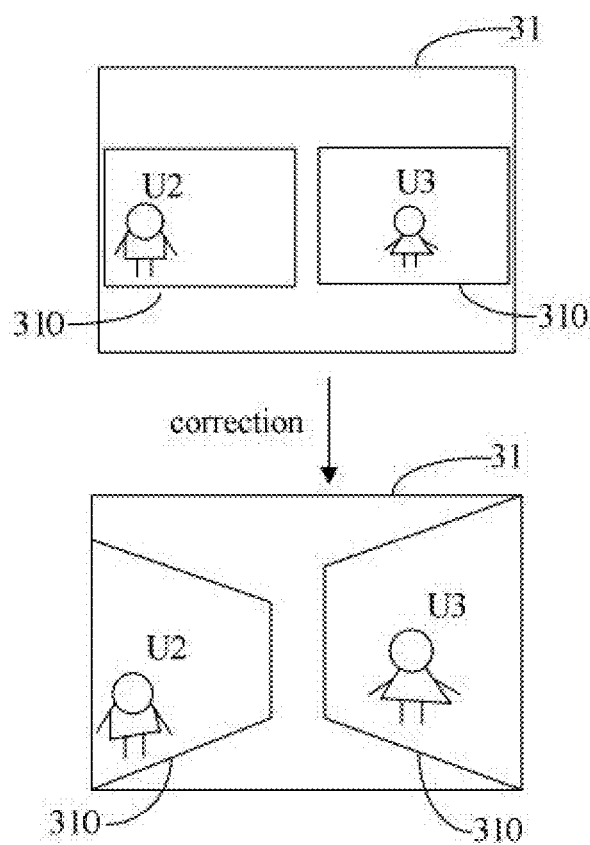
FIG. 17 is a schematic view of an embodiment of the video display before and after correction.

In FIG. 17, the video information of the user U1 and the user U2 are displayed on the translucent display 31 through the virtual windows 310. The virtual windows 310 may be tiled on the translucent display 31. The video information of the user U1 and the user U2 may also be corrected by the display module 305 and displayed in stereo on the translucent display 31. The virtual windows 310 may be three-dimensional trapezoidal frames to display corrected video information. A relative position of the scene in the video information would not be changed after correction. For example, since the user U2 is on one side of the virtual window before correction, the user U2 is still on the side of the virtual window after correction; since the user U3 is in the middle of the virtual window before correction, the user U3 is still in the middle of the virtual window after correction. Thus, when the user U2 watches the image of user U3 displayed on the translucent display 33 (in FIG. 13), the user U1 in front of the translucent display 31 may observe a scene that the image of user U2 watches the image of user U3. The positions of the virtual windows may be adjusted according to the number of user terminals.

Referring back to FIG. 13, the camera array 32 is substantially the same as the camera array 12 in FIG. 1. The method of selecting a camera from the camera array 32 is also substantially the same as the method of selecting a camera from the camera array 12. Since different video information displayed on the translucent display 31 are from a plurality of video communication devices, video captured by cameras corresponding to different users' images may be transmitted to different video communication devices.

The advantages of the video communication device 30 may include, but are not limited to, the following. A camera array is placed behind a translucent screen, and video information of a plurality of cameras may be selected according to the image position of a plurality of remote users displayed on the translucent screen. Thus, when the local user looks at the image position of the remote users' eyes on the translucent screen, the plurality of cameras may capture the local user's face, and the local user and the remote users can look directly into each other's eyes. The video communication device 30 provides users with an experience as if only a piece of transparent glass is placed between the local user and the remote user, which greatly increases the immersiveness. The local user and the remote user may feel like communicating with each other as if they are talking to each other on opposite sides of a glass.

Figure 18:
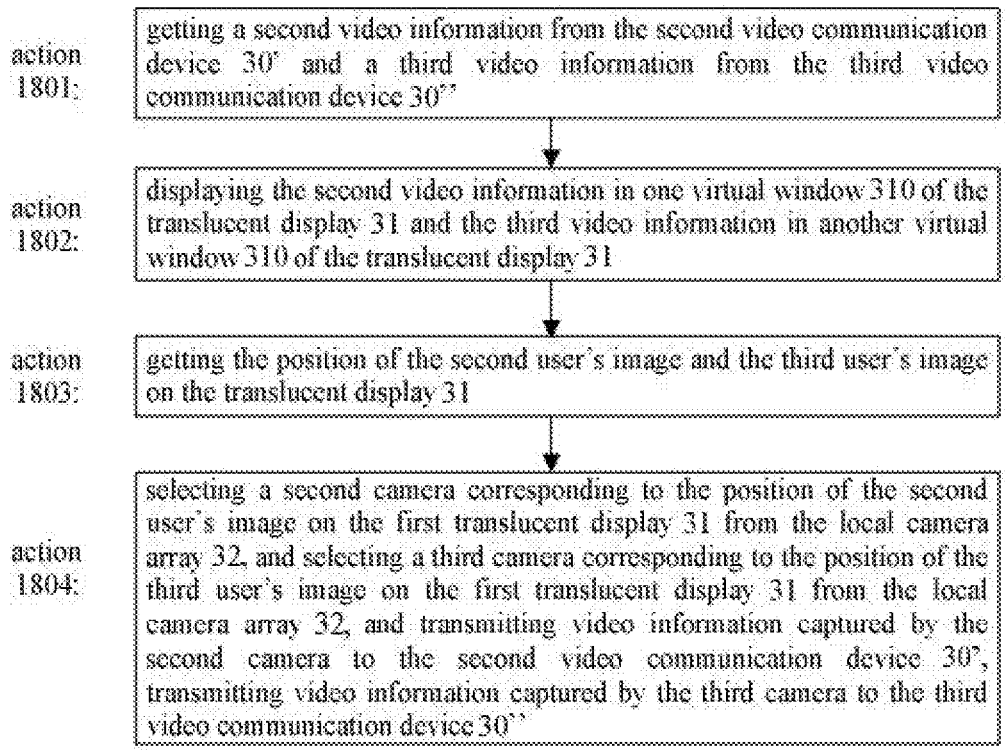
FIG. 18 is a flow chart of an embodiment of a method for video communication.

In FIG. 18, an embodiment of a method for video communication suitable for the first video communication device 30 in FIG. 13 is provided.

The method comprises:
- action 1801, receiving a second video information from the second video communication device 30' and a third video information from the third video communication device 30";
- action 1802, displaying the second video information in one virtual window 310 of the translucent display 31 and the third video information in another virtual window 310 of the translucent display 31;
- action 1803, receiving the position of the second user's image and the third user's image displayed on the translucent display 31;
- action 1804, selecting a second camera corresponding to the position of the second user's image displayed on the first translucent display 31 from the local camera array 32, and selecting a third camera corresponding to the position of the third user's image displayed on the first translucent display 31 from the local camera array 32, and transmitting video information captured by the second camera to the second video communication device 30', and transmitting video information captured by the third camera to the third video communication device 30".

In action 1801, the method of receiving a second video information from the second video communication device 30' and a third video information from the third video communication device 30" is similar with the method of receiving remote video information from the remote video communication device 10' in FIG. 10. Among the differences, the first video communication device 30 can get both the second video information and the third video information at the same time.

Figure 19:
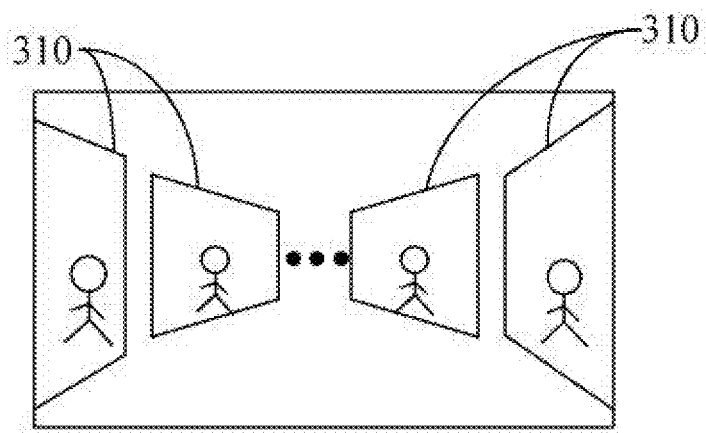
FIG. 19 is an arrangement view of an embodiment of virtual windows in the translucent display.

In action 1802, the video capture and processing module 301 may set the number and arrangement of the virtual windows 310 according to the specific needs. The virtual windows 310 are three-dimensional trapezoidal frames to display corrected video information. The video information received from different video communication devices are displayed in different virtual windows 310. Referring to FIG. 19, a plurality of virtual windows 310 are arranged in a row, and each of the plurality of virtual windows 310 is distributed independently on a display. When a local user communicates with other users through the video communication device, it is like everyone is in a circle to communicate with each other, as if many users communicate around a round table, and any two of them may communicate with each other eye to eye.

In action 1803, the method of acquiring the position of the second user's image and the third user's image on the translucent display 31 is substantially the same as the method of obtaining the position of remote user's image on the local translucent display device 11.

Figure 20:
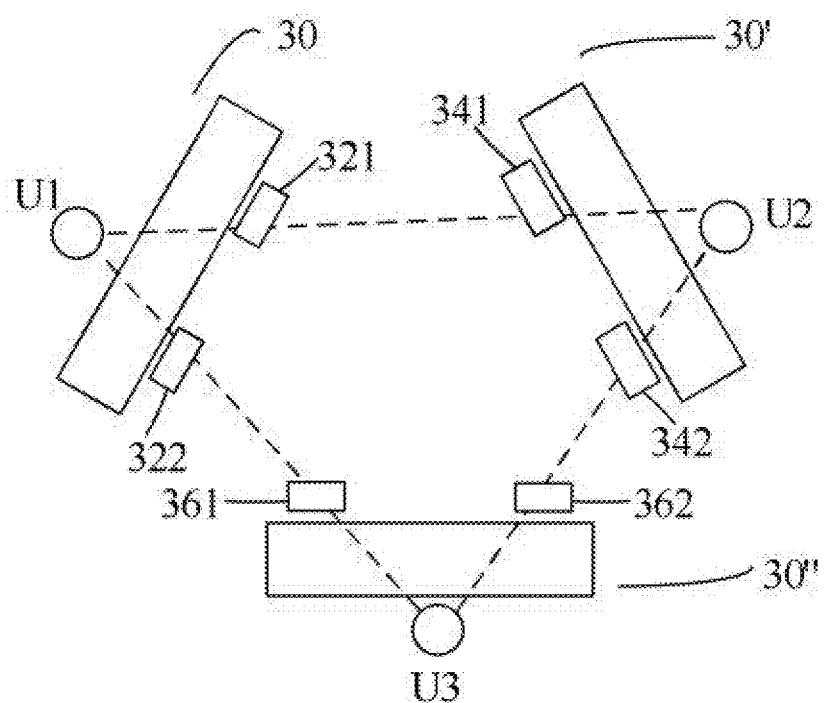
FIG. 20 is a position view of cameras and translucent displays of the video communication system.

In action 1804, the method of selecting the second camera and the third camera is substantially the same as the method of selecting the local cameras of action 1104. Referring to FIG. 20, a first camera 321 and a second camera 322 of the local camera array 32 are selected, the first camera 321 corresponds to the position of the user U2's image, and the second camera 322 corresponds to the position of user U3's image. A first video information captured by the first camera 321 is transmitted to the second video communication device 30' used by the user U2. A second video information captured by the second camera 322 is transmitted to the third video communication device 30" used by the user U3. A third video information captured by a third camera 341 is transmitted to the first video communication device 30 used by the user U1. A forth video information captured by a forth camera 342 is transmitted to the third video communication device 30" used by the user U3. A fifth video information captured by a fifth camera 361 is transmitted to the first video communication device 30 used by the user U1. A sixth video information captured by a sixth camera 362 is transmitted to the second video communication device 30' used by the user U2.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Depending on the embodiment, certain of the actions of methods described may be removed, others may be added, and the sequence of actions may be altered. The description and the claims drawn to a method may comprise some indication in reference to certain actions. However, the indication used is only to be viewed for identification purposes and not as a suggestion for ordering the actions.

What is claimed is:

1. A local video communication device comprising:
a local translucent display device configured to display remote video information received from a remote video communication device; and
a local camera array configured to capture local video information of a plurality of local users;
wherein the local translucent display device includes a naked-eye three-dimensional display, the local camera array comprises a plurality of local cameras arranged in a two-dimensional array, the local camera array is placed on a back of the local translucent display device, and
the local translucent display device further comprises a micro processing unit, wherein the micro processing unit comprises:
a video capture and processing module configured to select some of the plurality of local cameras corresponding to the image positions of a plurality of remote users as selected local cameras from the local camera array, and make the selected local cameras simultaneously capture and process the local video information of the plurality of local users, wherein the selected local cameras and the plurality of remote users are one-to-one correspondence, the images of the plurality of remote users are in the same remote video information, the image position of one remote user corresponds to one local camera in the selected local cameras, the selected local cameras capture local video information to accommodate eye positions and directions of the plurality of remote users;

a location acquisition module configured to obtain a face position of each of the plurality of local users;

a communication module configured to communicate with the remote video communication device; and a display module configured to display the remote video information.

2. The local video communication device of claim 1, wherein the location acquisition module is configured to obtain an eye position of each of the plurality of local users.

3. The local video communication device of claim 1, wherein the display module is configured to display the remote video information according to the face position of each of the plurality of local users.

4. The local video communication device of claim 1, further comprising a local identification device, the local identification device is used to identify the face position of each of the plurality of local users and transmit the face position of each of the plurality of local users to the remote video communication device.

5. The local video communication device of claim 4, wherein the local identification device includes at least one of optical cameras, infrared cameras, and wearable position sensor.

6. The local video communication device of claim 1, wherein the video capture and processing module is used to control the plurality of local cameras to work simultaneously and select and process video information captured by one or more than one of the plurality of local cameras corresponding to one or more than one face image position of the plurality of remote users.

7. The local video communication device of claim 1, wherein the video capture and processing module is used to only make one or more than one of the plurality of local cameras corresponding to one or more than one face image position of the plurality of remote users capture video information and process the video information.

8. The local video communication device of claim 1, further comprising a speaker array, the speaker array is distributed on the back of the local translucent display device, and the speaker array is used to play voice of the plurality of remote users according to source locations of the plurality of remote users.

9. The local video communication device as claimed in claim 1, further comprising a plurality of stereo microphones, and the plurality of stereo microphones is placed in front of the local translucent display device, and the plurality of stereo microphones is configured to collect local sounds of the plurality of local users.

10. A method for video communication, the method comprising:

receiving remote video information of a plurality of remote users from a remote video communication device;

displaying the remote video information on a local translucent display device;

acquiring image positions of the plurality of remote users on the local translucent display device;

selecting some of the plurality of local cameras corresponding to the image positions of the plurality of remote users as selected local cameras from a local camera array, wherein the selected local cameras and the plurality of remote users are one-to-one correspondence, the images of the plurality of remote users are in the same remote video information, the image position of one remote user corresponds to one local camera in the selected local cameras;

capturing local video information simultaneously by the selected local cameras to accommodate eye positions and directions of the plurality of remote users; and transmitting the local video information to the remote video communication device.

11. The method as claimed in claim 10, wherein an image display frame of the translucent display device and an image acquisition frame of the selected local cameras are alternately performed one frame by one frame.

12. The method as claimed in claim 10, wherein the image positions of the plurality of remote users on the local translucent display device are acquired by calculating a position of a remote camera array and a relative position of each of the plurality of remote users' images captured by the remote camera array.

13. The method as claimed in claim 10, wherein the image positions of the plurality of remote users on the local translucent display device are acquired by a remote identification device located in front of the remote translucent display device.

14. The local video communication device of claim 1, wherein the display module is configured to display different remote video information simultaneously according to the face position of each of the plurality of local users.

15. The local video communication device of claim 1, wherein the location acquisition module is further configured to obtain a depth information between each of the plurality of local users and the local translucent display device.

* * * * *